Figure 1:
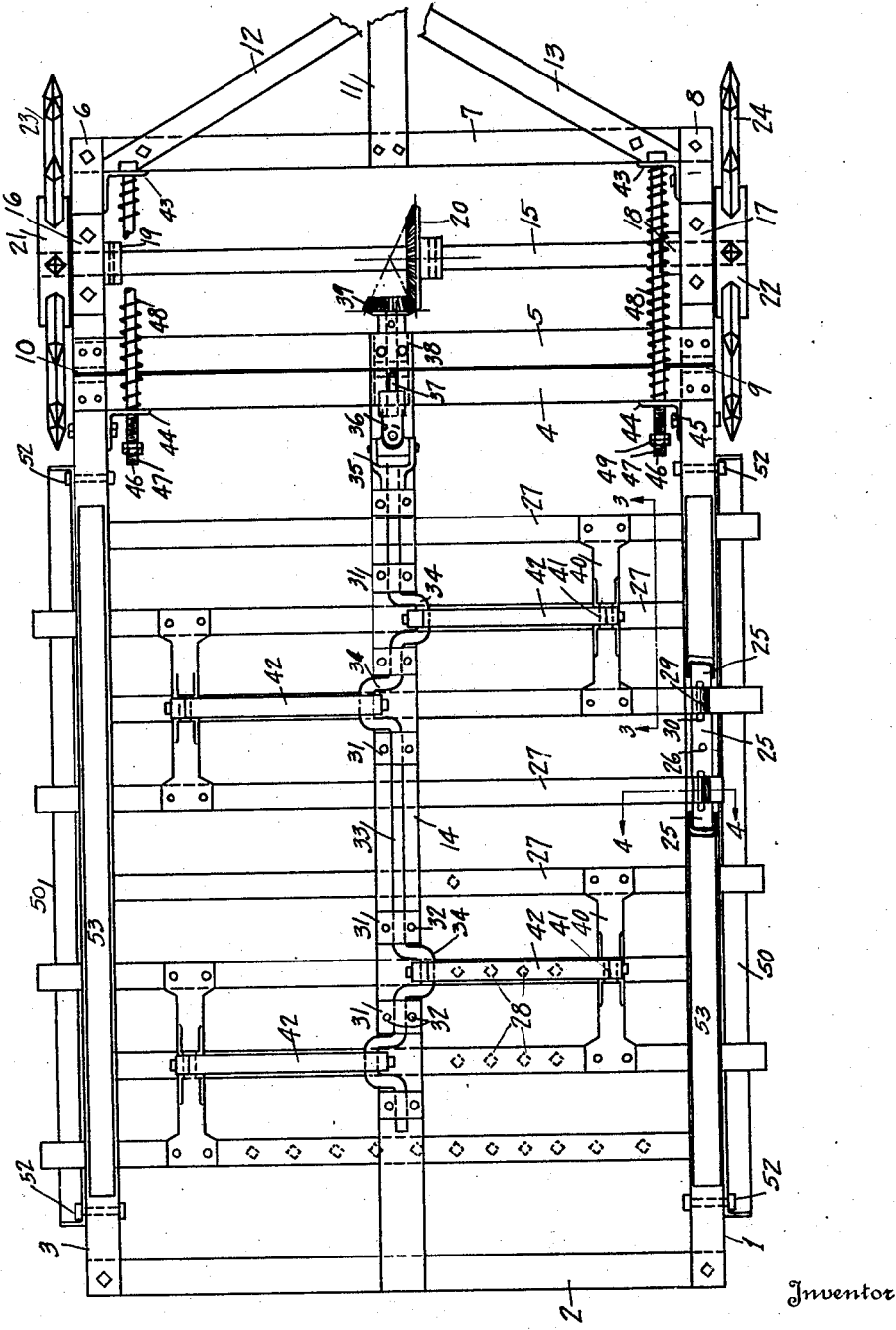

April 29, 1930.  C. GAUBATZ  1,756,820
SPIKE TOOTH HARROW
Filed Aug. 15, 1929  2 Sheets-Sheet 1

Inventor
Conrad Gaubatz
By
His Attorney

April 29, 1930.　　　C. GAUBATZ　　　1,756,820
SPIKE TOOTH HARROW
Filed Aug. 15, 1929　　　2 Sheets-Sheet 2
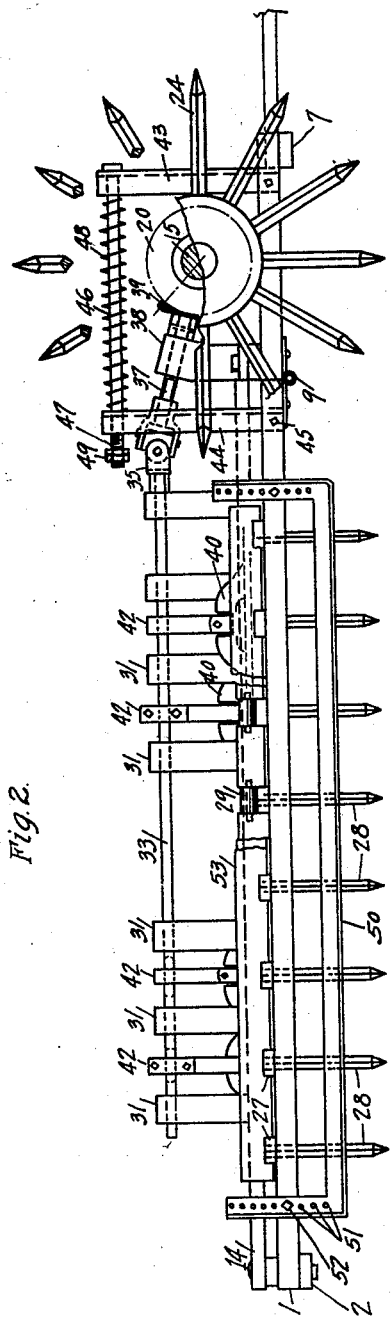
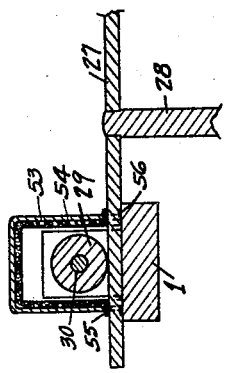
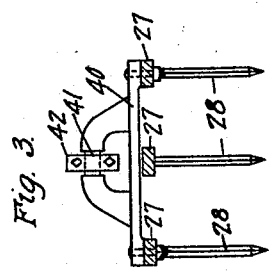
Inventor
Conrad Gaubatz
By John W. Goss
His Attorney Patented Apr. 29, 1930

1,756,820

UNITED STATES PATENT OFFICE

CONRAD GAUBATZ, OF MANSFIELD, OHIO

SPIKE-TOOTH HARROW

Application filed August 15, 1929. Serial No. 386,039.

This invention relates to spike tooth harrows of the reciprocating type.

The primary object of the invention is to provide a means for imparting movement to a series of supporting bars having spike teeth supported thereby, the bars being adapted to reciprocate in opposite directions.

Another object of the invention is to provide a spike tooth harrow frame that is provided with an auxiliary frame that is hinged to the main frame to allow flexibility thereof to permit the spike teeth thereof to penetrate deeper into the soil at low places in the field.

Another object of the invention is to provide means whereby the auxiliary hinged frame can be automatically forced into the soil under yielding tension and to prevent the hinged frame from moving upward beyond a plane with the main body of the frame.

Another object of the invention is to provide runners or shoes on each side of the main body of the frame, provide means for supporting and transporting the harrow from the field, and also to regulate and adjust the runners to provide for the proper depth of penetration of the spike teeth into the soil, when used for harrowing.

Another object of the invention is to provide means for mounting a crank shaft in the center of the main body of the frame which is provided with a series or plurality of cranks formed in opposed relation to each other.

Another object of the invention is to provide means for reducing the friction of the reciprocating supporting bars, and to guide the supporting bars to keep same from moving from their normal positions in the bearings.

Another object of the invention is to provide housings to cover the bearings and the ends of the supporting bars, so that dirt or other débris cannot work into the bearings and cause undue friction, the housings being provided with a felt lining which functions to brush away the soil from the bars, before it can enter the bearings.

Another object of the invention is to so construct the frame that when the supporting bars are reciprocating in their bearings, the central frame bar that supports the crank shaft will clear the supporting bars and thereby operate without friction.

Another object of the invention is to provide means for imparting movement to the supporting bars by traction wheels which are provided with spike teeth, but made longer so that they will get traction from the soil at a greater depth than the spiked teeth of the harrow.

Another object of the invention is to provide means consisting of a universal joint and bevel gears to impart movement to another shaft that is arranged to intersect same, at right angles, without creating excessive friction.

These and other objects are attained by the mechanism illustrated in the accompanying drawing in which Fig. 1 is a plan view of the invention.
Fig. 2 is a side elevation of Fig. 1.
Fig. 3 is a section on the line 3—3 of Fig. 1.
Fig. 4 is a section on the line 4—4 of Fig. 1.

The embodiment of the harrow as described herein and shown in the drawings, is the preferable construction and application of the invention to provide a thoroughly practical working device for harrowing and pulverizing the soil in its operation for the purpose intended and to disintegrate clods of dirt, making it unnecessary to harrow the soil with other implements or travel over the soil more than once to properly harrow same.

The specific features of the construction of the harrow constituting the invention and the principle of its operation will now be described so that the concept and reduction to practice of the invention, may be clearly understood and comprehended by those skilled in the art.

In drawings, reference numerals, 1, 2, 3, and 4, represent the main frame bars of the harrow. An auxiliary frame comprising the frame bars 5, 6, 7, and 8, is attached to the main frame by hinges 9 and 10 and is prevented from moving above the plane of the main frame by the abutting joints of the hinges. A tongue 11 is attached to the auxiliary frame and braced thereto by the braces 12 and 13.

A longitudinal central frame bar 14 is secured to the main frame at the center thereof. A shaft 15 is journaled on the auxiliary frame in bearings provided in the standards 16 and 17 and held in place by the collars 18 and 19 which are provided with ordinary through pins.

A master bevel gear wheel 20 is mounted upon and secured to the cross shaft 15. The shaft 15 is fixed in the hubs of the wheels 21 and 22 which are constructed of a plurality of spike-like teeth 23 and 24 arranged radially around the wheels. The spike teeth of the wheels are made longer than the spike teeth of the harrow to permit the teeth to penetrate into the soil deeper for efficient traction. On top of the side frame bars 1 and 3, a series of blocks 25 are secured by bolts 26 or the like, and they are arranged in alinement with each other and spaced apart at their ends to permit the ends of the supporting bars 27 to slidingly operate and be guided therebetween being supported for reciprocation by the side bars of the frame 1 and 3. The shaft 15, or its connection with one of the wheels, may be conveniently formed, as by a conventional differential or ratchet connection, not necessary to illustrate, to permit turning of the harrow.

At pre-determined distances apart, spike teeth 28 are secured to the supporting bars 27. The ends of the supporting bars 27 are held in place, against vertical movement, by rollers 29 which are loosely mounted upon pins 30 and are in contact with the upper faces of the ends thereof. This construction prevents undue friction of parts.

Upon the longitudinal central frame bar 14 a series of standards 31, provided with bearings, are mounted thereon and secured thereto by bolts 32. A crank shaft 33 is journaled in the bearings of the standards and is provided with a plurality of cranks 34 which are formed on the crank shaft and alternately extending in opposite directions at pre-determined points along the crank shaft.

The front end of the crank shaft is provided with one part 35 of a universal joint which is connected to complementary part 36 which is slidingly connected to a shaft 37. The shaft 37 is journaled in a standard 38 which is secured to the auxiliary frame.

Upon the end of the shaft 37 a pinion bevel gear 39 is secured meshing with the master bevel gear 20, which imparts movement to the pinion bevel gear and the crank shaft 33.

Connecting bars 40 which are provided with wrist pins 41, are secured to the supporting bars 27 in series that is, a bar is connected to the first bar and the third bar of a series, leaving the second bar in the series free. Another connecting bar 40 is then connected from the other side of the crank shaft to the second bar and to a fourth bar, completing a series. It will be observed that when two of the supporting bars move in one direction, simultaneously therewith, the other two supporting bars will move in an opposite direction. It will also be observed that the connecting bars are located alternately on opposite sides of the crank shaft 33 and can be continued in series indefinitely.

To connect the cranks 34 to the wrist pins 41, pitmen 42 are provided and when movement is imparted to the crank shaft 33 the supporting bars are reciprocated in opposite directions alternately thoroughly cutting and pulverizing the soil and preparing it for seeding. It will be understood that as many series of supporting bars can be used as desired for different sizes of harrows.

To force the auxiliary frame into the soil under yielding tensions for harrowing purposes in traveling over low parts of the field, or to yield when striking an obstruction the following mechanism is provided, standards 43 and 44 are provided and attached to the frame bars of the auxiliary frame by bolts 45. The standards 43 and 44 are preferably made of angle-iron. The standards are provided with apertures at their upper or free end and rods 46 are inserted therein. One end of the rods is screw threaded as shown at 47. Expansive coil springs 48 are mounted on the rods 46 and exert a pressure on the standards 43, to yieldingly force the hinged auxiliary frame downward. The lock nuts 49 can be adjusted. If in harrowing the field, low parts are encountered, the teeth 23 and 24 of the wheels and harrow teeth are forced into the soil at low places.

To provide means for transporting the harrow from the field and regulate and adjust the spike teeth of the harrow to penetrate more or less into the soil the following means are employed: Runners (or shoes) 50 are provided and preferably made of angle-iron. They are turned up and rounded at each end and a series of apertures 51 provided in the vertical ends for adjusting the runners up or down. They are held in place by bolts 52.

When it is desired to transport the harrow from the field the runners are adjusted to permit the runners to be located below the spike teeth 28, of the harrow. When harrowing the soil they are adjusted to permit the spike teeth to project below runners the desired distance.

To protect the bearings of the supporting bars from dirt and débris housings 52 are provided and lined with felt 54 or the like. The felt is turned at the bottom at 55 and is adapted to contact with the ends of the supporting bars and brush away any soil or débris before it can enter into the bearings of the supporting bars, as is clearly shown in Fig. 4 of the drawings. The housings are preferably bent as shown at 56.

The hereinbefore described construction and principle of the harrow provides for thoroughly pulverizing and disintegrating the soil for the purpose intended. Immaterial alterations may be made in the construction of the harrow without deviating from the spirit of invention herein described; hence it is not intended to limit the invention to the exact structure shown.

I claim:

1. In a harrow, a main frame, an auxiliary frame, ground wheels carried by the auxiliary frame, supporting bars mounted for reciprocation transverse the main frame, means for connecting the relatively opposite ends of alternate bars in unit pairs, a shaft extending longitudinally of and carried by the main frame, a crank in said shaft for each unit pair of bars, connections between the cranks and the unit pairs of bars, and means for operating the shaft.

2. In a harrow, a main frame, an auxiliary frame having hinged connection with the main frame, the connection limiting the upward movement of the main frame, transversely-reciprocating bars mounted in the main frame, spike teeth carried by the bars, means for reciprocating the bars, and means for resiliently connecting the main and auxiliary frames to maintain the main frame under yielding pressure during the operation of the reciprocating bars.

3. In a harrow, a main frame, an auxiliary frame having hinged connection with the main frame, a ground wheel support for the auxiliary frame, transversely reciprocating bars mounted in the main frame, spike teeth carried by said bars, means for operating the bars, standards rising from the main frame, standards rising from the auxiliary frame, and spring means intermediate the standards to exert continuous pressure on the main frame.

4. In a harrow, a main frame, reciprocating bars movable transversely of the frame, spike teeth carried by the bars, means incident to the movement of the harrow for operating said bars, runners extending longitudinally of the main frame and including ground engaging shoes, and means for adjusting the runners vertically of the main frame to permit said runners to limit the cutting depth of the teeth or to be moved below the teeth to prevent cutting operation of the teeth during movement of the harrow.

In testimony whereof I affix my signature.

CONRAD GAUBATZ.